(12) United States Patent
Lee

(10) Patent No.: US 10,097,441 B2
(45) Date of Patent: Oct. 9, 2018

(54) APPARATUS AND METHOD FOR ANALYZING INFORMATION

(71) Applicant: Sang Yup Lee, Seoul (KR)

(72) Inventor: Sang Yup Lee, Seoul (KR)

( * ) Notice: Subject to any disclaimer, the term of this patent is extended or adjusted under 35 U.S.C. 154(b) by 49 days.

(21) Appl. No.: 15/333,864

(22) Filed: Oct. 25, 2016

(65) Prior Publication Data

US 2018/0077045 A1 Mar. 15, 2018

(30) Foreign Application Priority Data

Sep. 9, 2016 (KR) .......................... 10-2016-0116584

(51) Int. Cl.
*H04L 12/26* (2006.01)
*G06Q 30/02* (2012.01)

(52) U.S. Cl.
CPC .......... *H04L 43/16* (2013.01); *G06Q 30/0201* (2013.01); *G06Q 30/0255* (2013.01); *H04L 43/18* (2013.01)

(58) Field of Classification Search
CPC ....... H04L 67/22; H04L 67/02; H04L 67/306; H04L 51/18; H04L 9/321; H04L 9/3247; H04Q 30/02; H04Q 30/0203; H04Q 30/0245; H04Q 30/0241; H04Q 30/0242; H04Q 30/0251; H04Q 30/0268; H04Q 30/0269; H04Q 30/0276
See application file for complete search history.

(56) References Cited

U.S. PATENT DOCUMENTS

| | | | | |
|---|---|---|---|---|
| 5,933,811 A | * | 8/1999 | Angles | .................... G06Q 30/02 705/14.56 |
| 8,639,563 B2 | * | 1/2014 | Angell | .................... G06Q 30/02 705/14.57 |
| 9,836,771 B1 | * | 12/2017 | Burcham | ........... G06Q 30/0277 |
| 2001/0037206 A1 | * | 11/2001 | Falk | ........................ G06Q 30/02 705/1.1 |
| 2011/0258137 A1 | | 10/2011 | Pasta | |

(Continued)

FOREIGN PATENT DOCUMENTS

| KR | 10-2011-0088324 A | 8/2011 |
|---|---|---|
| KR | 10-2013-0015299 A | 2/2013 |

(Continued)

*Primary Examiner* — Warner Wong
(74) *Attorney, Agent, or Firm* — Novick, Kim & Lee, PLLC; Jae Youn Kim

(57) ABSTRACT

Provided are an apparatus and method for analyzing information. The method, which is performed by an information analyzing apparatus, includes receiving second-user information contributing to generation of a first signal from a first processing apparatus generating the first signal, generating an information packet corresponding to the second-user information, transmitting the information packet to a second processing apparatus indicated in the second-user information, receiving an information packet result from the second processing apparatus, wherein the information packet result is obtained by adding a second signal to the information packet, and generating a level index by analyzing the information packet result, wherein the level index represents levels of tangible and intangible elements in the vicinity of the first processing apparatus.

13 Claims, 10 Drawing Sheets

(56) References Cited

U.S. PATENT DOCUMENTS

| | | | | |
|---|---|---|---|---|
| 2012/0089455 | A1* | 4/2012 | Belani | G06Q 30/0245 |
| | | | | 705/14.44 |
| 2013/0046613 | A1* | 2/2013 | Farahat | G06Q 30/00 |
| | | | | 705/14.43 |
| 2014/0337098 | A1 | 11/2014 | Ganesh et al. | |
| 2015/0180911 | A1* | 6/2015 | Mavinakuli | H04L 41/0273 |
| | | | | 715/234 |
| 2016/0055498 | A1 | 2/2016 | Wang et al. | |
| 2016/0142541 | A1* | 5/2016 | Sharpe | H04M 3/5141 |
| | | | | 379/92.01 |
| 2016/0225021 | A1* | 8/2016 | Cochrane | G06Q 30/0255 |
| 2017/0124606 | A1* | 5/2017 | Belle | G06Q 30/0282 |
| 2017/0149955 | A1* | 5/2017 | Celik | H04M 1/72563 |

FOREIGN PATENT DOCUMENTS

| | | |
|---|---|---|
| KR | 10-2015-0093532 A | 8/2015 |
| KR | 10-2016-0019993 A | 2/2016 |
| WO | 0167333 A1 | 9/2001 |

* cited by examiner

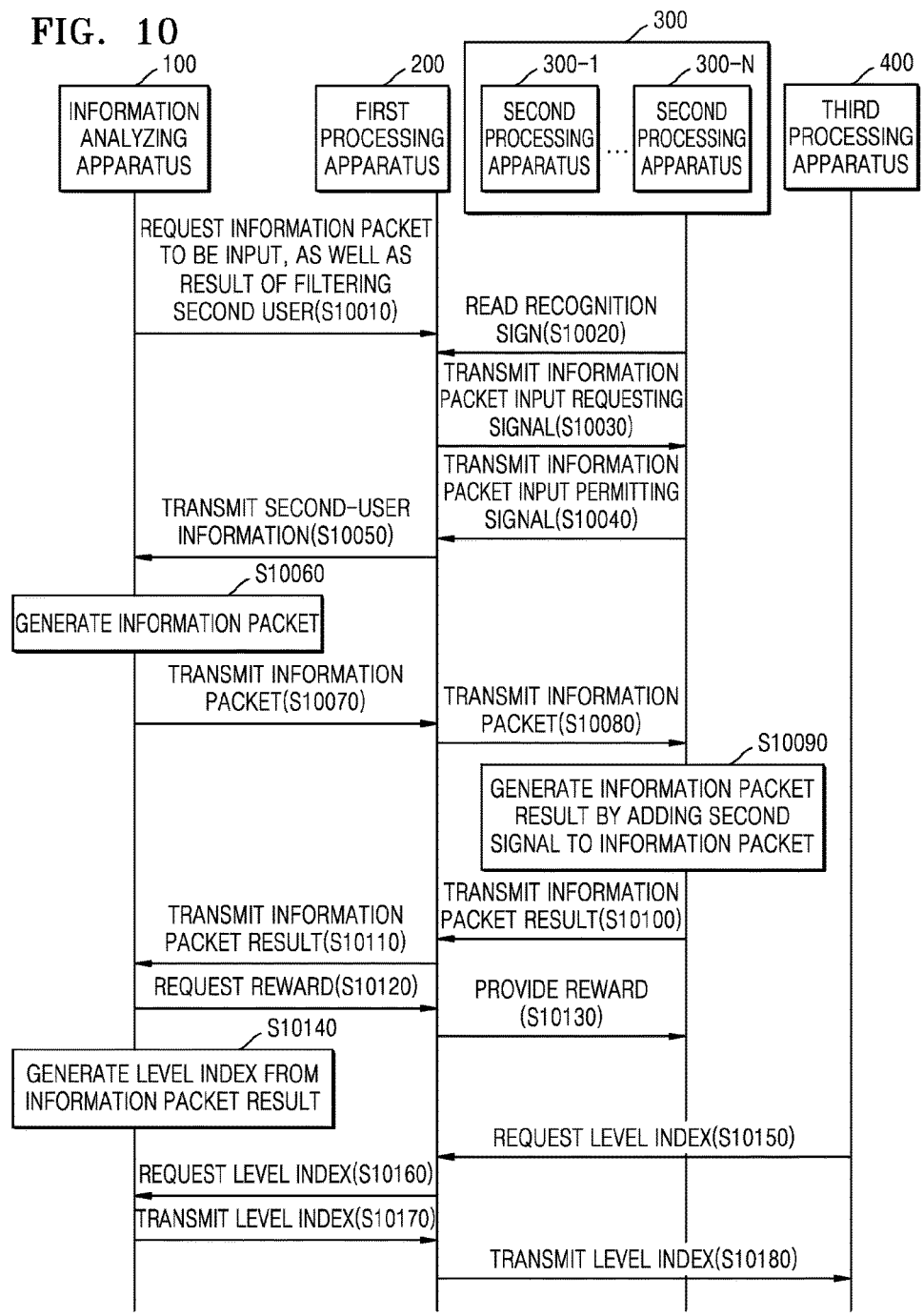

APPARATUS AND METHOD FOR ANALYZING INFORMATION

CROSS-REFERENCE TO RELATED APPLICATION

This application claims the benefit of priority of Korean Patent Application No. 10-2016-0116584, filed on Sep. 9, 2016, in the Korean Intellectual Property Office, the disclosure of which is incorporated herein in its entirety by reference.

BACKGROUND

1. Field

One or more embodiments relate to an apparatus and method for analyzing information.

2. Description of the Related Art

With economic development, as individual incomes increase, spending has grown in many different fields, including food services, beauty services, accommodation services, shopping, etc. In this situation, a large number of shops are making various efforts to find promotional and marketing methods for securing customers so as to increase sales.

Information disclosed in this Background section was already known to the inventors before achieving the inventive concept or is technical information acquired in the process of achieving the inventive concept. Therefore, it may contain information that does not form the prior art that is already known to the public in this country.

SUMMARY

One or more embodiments are directed to easily managing a place including a first terminal by using a composite index representing levels of tangible and intangible elements in the vicinity of the first terminal on the basis of an information packet result fed back from a second terminal.

One or more embodiments are directed to analyzing an element desired by a second user who owns a second terminal and providing the second user with convenience corresponding to a result of analyzing the desired element by using a composite index representing levels of tangible and intangible elements in the vicinity of a first terminal on the basis of an information packet result fed back from the second terminal.

One or more embodiments are directed to inducing a second user who owns a second terminal providing an information packet result to visit a place including a first terminal by providing a reward to the second terminal.

Additional aspects will be set forth in part in the description which follows and, in part, will be apparent from the description, or may be learned by practice of the presented embodiments.

According to one or more embodiments, an information analyzing apparatus includes a first generator configured to receive second-user information contributing to generation of a first signal from a first processing apparatus generating the first signal, and generate an information packet corresponding to the second-user information, and a second generator configured to transmit the information packet to a second processing apparatus indicated in the second-user information, receive from the second processing apparatus an information packet result obtained by adding a second signal to the information packet, and analyze the information packet result to generate a level index representing levels of tangible and intangible elements in the vicinity of the first processing apparatus.

The second generator may include a first calculator configured to generate a first index regarding the first processing apparatus from the information packet result, a second calculator configured to generate a second index related to a second user from the information packet result, and a third calculator configured to generate a third index, which is to be applied to the first processing apparatus, from the information packet result.

The information analyzing apparatus may further include a processor configured to generate the level index based on the first to third indexes and transmit the level index to a third processing apparatus according to a request from the third processing apparatus.

The information analyzing apparatus may further include a setting unit configured to set a first condition for transmitting the information packet, and a filter configured to filter second-user information satisfying the first condition from the second-user information.

The information analyzing apparatus may further include a reward provider configured to provide accumulable reward information to the second processing apparatus receiving the information packet result.

According to one or more embodiments, an information analyzing method, which is performed by an information analyzing apparatus, includes receiving second-user information contributing to generation of a first signal from a first processing apparatus generating the first signal, generating an information packet corresponding to the second-user information, transmitting the information packet to a second processing apparatus indicated in the second-user information, receiving an information packet result from the second processing apparatus, wherein the information packet result is obtained by adding a second signal to the information packet; and generating a level index by analyzing the information packet result, wherein the level index represents levels of tangible and intangible elements in the vicinity of the first processing apparatus.

The generating of the level index may include generating a first index regarding the first processing apparatus from the information packet result, generating a second index related to a second user from the information packet result, and generating a third index from the information packet result, wherein the third index is to be applied to the first processing apparatus.

The information analyzing method may further include generating the level index based on the first to third indexes and transmitting the level index to a third processing apparatus according to a request from the third processing apparatus.

The information analyzing method may further include setting a first condition for transmitting the information packet, and filtering second-user information satisfying the first condition from the second-user information.

The information analyzing method may further include transmitting accumulable reward information to the second processing apparatus receiving the information packet result.

According to one or more embodiments, there are provided other methods, systems, and a computer program configured to perform the methods.

BRIEF DESCRIPTION OF THE DRAWINGS

These and/or other aspects will become apparent and more readily appreciated from the following description of the embodiments, taken in conjunction with the accompanying drawings in which:

FIGS. 6 to 10 are flowcharts of information analyzing methods according to embodiments.

DETAILED DESCRIPTION

Figure 1:
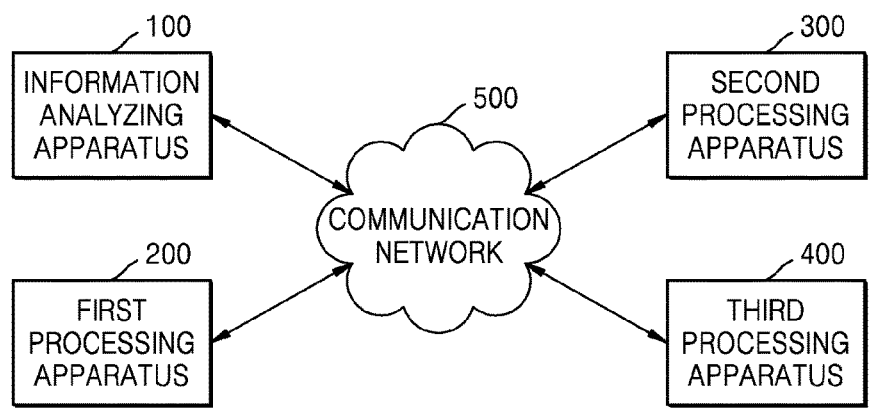
FIG. 1 is a schematic block diagram of an information analyzing system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term 'and/or' includes any and all combinations of one or more of the associated listed items. Expressions such as "at least one of," when preceding a list of elements, modify the entire list of elements and do not modify the individual elements of the list.

The advantages and features of the inventive concept and a method of achieving them would be apparent from the following embodiments in conjunction with the accompanying drawings. However, the inventive concept is not limited to these embodiments, and may be embodied in many different forms and should be understood to cover all modifications, equivalents, and alternatives falling within the scope of the inventive concept. The following embodiments are provided so that this disclosure will be thorough and complete and will fully convey the inventive concept to those of ordinary skill in the art. In the following description, well-known technologies are not described in detail if it is determined that they would obscure the inventive concept due to unnecessary detail.

The terminology used herein is for the purpose of describing particular embodiments only and is not intended to be limiting of the inventive concept. As used herein, the singular forms 'a', 'an' and 'the' are intended to include the plural forms as well, unless the context clearly indicates otherwise. It will be further understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof. It will be understood that, although the terms 'first', 'second', 'third', etc., may be used herein to describe various elements, these elements should not be limited by these terms. These terms are only used to distinguish one element from another element.

In the present disclosure, the term 'first user' should be understood to include an employee who works in a shop and can manipulate a first processing apparatus and provide tangible and intangible elements to a second user which will be described below. The term 'first processing apparatus' (see reference numeral 200 of FIG. 1) means an apparatus, e.g., a point-of-sale (POS) terminal, which is manipulated by the first user and is capable of issuing a receipt. Here, the issuing of the receipt should be understood to mean that the second user (which will be described below) may pay for an object by a credit card and/or cash. The tangible and intangible elements are provided in the vicinity of the first processing apparatus. The vicinity of the first processing apparatus may include a place including the first processing apparatus, e.g., a shop. The tangible elements should be understood to include an object (e.g., a product, food, a service, or the like) for which the second user may pay to purchase it in a shop. The intangible elements should be understood to include a service which the first user provides to the second user, a service which the second user may use without paying for it, and the like. However, the first processing apparatus is not limited as being provided offline (or in a shop) and may be provided online (in an online shop), including a device capable of issuing a receipt, as described above.

The term 'second user' should be understood to include a user who may visit the vicinity of the first processing apparatus to be provided tangible and intangible elements, e.g., a consumer, a client, or the like. The term 'second processing apparatus' (see reference numeral 300 of FIG. 1) should be understood to include a mobile terminal (such as a notebook computer, a handheld device, a smart phone, or a tablet personal computer (PC)), a general wired/wireless phone, or a desktop computer which a second user manipulates, or any appropriate device which uses such a device or is directly or indirectly connected thereto. The second processing apparatus is not, however, limited to the above description, and any device having a web browsing function as described above may be employed as the second processing apparatus.

The term 'third user' should be understood to include a company that manages the vicinity of the first processing apparatus, i.e., a shop, and/or an employee who works in the company. The first user and the third user may be different from each other since the first user works in the shop and the third user works in the company. The term 'third processing apparatus' (see reference numeral 400 of FIG. 1) should be understood to include a mobile terminal (such as a notebook computer, a handheld device, a smart phone, or a tablet PC), a general wired/wireless phone, or a desktop computer which a second user manipulates, or any appropriate device which uses such a device or is directly or indirectly connected thereto. The third processing apparatus is not limited to the above description and any device having a web browsing function as described above may be employed as the third processing apparatus.

The term 'reward' should be understood to include a coupon, a gift card, accumulated money, mileage points, points, a stamp, or the like to be provided to the second processing apparatus belonging to the second user who satisfies a condition. The second user may purchase or use a tangible element and an intangible element with accumulated rewards, or receive a cash refund therefor. Here, the reward may be registered with an information analyzing apparatus 100 of FIG. 1 via the third processing apparatus by the third user.

Hereinafter, various embodiments will be described in detail with reference to the accompanying drawings. When these embodiments are described using the accompanying drawings, the same or corresponding elements are assigned the same reference numerals and are not redundantly described.

FIG. 1 is a schematic block diagram of an information analyzing system 1 according to one embodiment. Referring to FIG. 1, the information analyzing system 1 may include the information analyzing apparatus 100, a first processing apparatus 200, a second processing apparatus 300, a third processing apparatus 400, and a communication network 500.

The information analyzing apparatus 100 according to one embodiment may receive second-user information contributing to generation of a first signal from the first processing apparatus 200 generating the first signal, and generate an information packet corresponding to the second-user information. Here, the first signal should be understood to include a signal generated when a second user visits the vicinity of the first processing apparatus 200 or a place including the first processing apparatus 200 (hereinafter referred to as a 'shop') and pays for a tangible element and/or an intangible element. When the first signal is generated, a receipt and/or purchase history information may be generated. Here, the purchase history information may include information regarding elements which the second user purchases and may further include information regarding the shop including the first processing apparatus 200. The purchase history information may be included in the second-user information.

The information packet should be understood to include survey information provided by the second processing apparatus 300 to evaluate tangible and intangible elements provided in the shop. The information packet may include a first information packet, a second information packet, and a third information packet. The first information packet may include survey information requesting the second user to select levels of satisfaction with respect to the tangible and intangible elements provided in the shop. The first information packet is provided such that each question included in the survey information is answered on a scale of 1 to 5, where '1' represents extremely dissatisfied, '2' represents dissatisfied, '3' represents normal, '4' represents satisfied, and '5' represents very satisfied. Here, it may be determined that the second user has a negative opinion about each of the tangible and intangible elements and would damage a third user's reputation when the second user selects '1', '2', or '3', the second user has nothing to complain about regarding the tangible and intangible elements but it is likely that the second user will be lost to a competitor of the third user when the second user selects '4', and the second user is likely to purchase each of the tangible and intangible elements again and recommend the third user to other second users when the second user selects '5'. The second information packet may include survey information requesting the second user to select a degree of satisfaction with respect to an intangible element, e.g., an event held in the shop, which is planned by the third user and provided by the first user. The second information packet may be provided such that each question included in the survey information is answered on a scale of 1 to 5, where '1' represents extremely dissatisfied, '2' represents dissatisfied, '3' represents normal, '4' represents satisfied, and '5' represents very satisfied. The third information packet may include survey information related to a service which the third user should provide in the near future, in which the second user may answer in the form of text to questions included in the survey information. The information packet is provided in the form of a uniform resource locator (URL) to the second processing apparatus 300. The second processing apparatus 300 may access the URL to view the information packet.

The information analyzing apparatus 100 may differently generate the information packet according to the second-user information on the basis of the second-user information received from the first processing apparatus 200. For example, the second-user information may include purchase information and a unique number of the first processing apparatus 200 indicated in the purchase information, and may include at least one among local information, the second user's sex and age, a purchase amount, a number of times that purchasing is performed, and information regarding the second processing apparatus 300 (e.g., a telephone number, a telecommunication company, etc.). The information analyzing apparatus 100 may differently generate the information packet to correspond to the second-user information. For example, the information packet may be differently generated with respect to a second user in his/her twenties and a second user in his/her thirties or may be differently generated with respect to a male user and a female user.

The information analyzing apparatus 100 may transmit the information packet to the second processing apparatus 300 indicated in the second-user information, receive an information packet result which is a result of adding a second signal to the information packet from the second processing apparatus 300, and analyze the information packet result to generate a level index representing levels of tangible and intangible elements of the shop, an event held in the shop and/or a service which the third user should provide in the near future. Here, the second signal may include scores which the second user selects with respect to the first and second information packets provided on a scale of 1 to 5 and/or text information regarding the third information packet.

The level index may include a first index to a third index. The first index may include an average index obtained by calculating an average of scores which the second user selects from a first information packet result, a user index representing users who have a good feeling toward the third user, and a weight. The second index may include an average index obtained by calculating an average of scores which the second user selects from the second information packet result. The third index may include information containing a summary of services which the third user should provide in the near future, obtained by applying a machine learning technique to the third information packet result.

The information analyzing apparatus 100 may provide accumulable reward information to the first processing apparatus 200 receiving the information packet result, and transmit the level index to the third processing apparatus 400 according to a request from the third processing apparatus 400.

When the first signal is generated, the first processing apparatus 200 may transmit the second-user information to the information analyzing apparatus 100. As an alternative example, the first processing apparatus 200 may relay information between the information analyzing apparatus 100, the second processing apparatus 300, and the third processing apparatus 400.

The second processing apparatus 300 may receive the information packet from the information analyzing apparatus 100, and transmit to the information analyzing apparatus 100 the information packet result obtained by adding the second signal to the information packet.

The third processing apparatus 400 may manage the shop and second users by requesting and receiving the level index generated by the information analyzing apparatus 100. In detail, the third processing apparatus 400 may perform target marketing with respect to the second users by using the level index, manage the shop, provide convenience suitable for each of second users, induce the second users to visit the shop again and purchase an intangible/tangible element of the shop again, and evaluate management of the second users and sales performance.

The communication network 500 connects the information analyzing apparatus 100, the first processing apparatus 200, the second processing apparatus 300, and the third processing apparatus 400 with one another. That is, the communication network 500 means an access path in which the first processing apparatus 200, the second processing apparatus 300, and the third processing apparatus 400 access the information analyzing apparatus 100 to transmit data to or receive data from the information analyzing apparatus 100. Examples of the communication network 500 may include wired networks, such as local area networks (LANs), wide area networks (WANs), metropolitan area networks (MANs), integrated service digital networks (ISDNs), etc., or wireless networks, such as wireless LANs, CDMA, Bluetooth, satellite communication, etc., but the scope of the inventive concept is not limited thereto.

Figure 2:
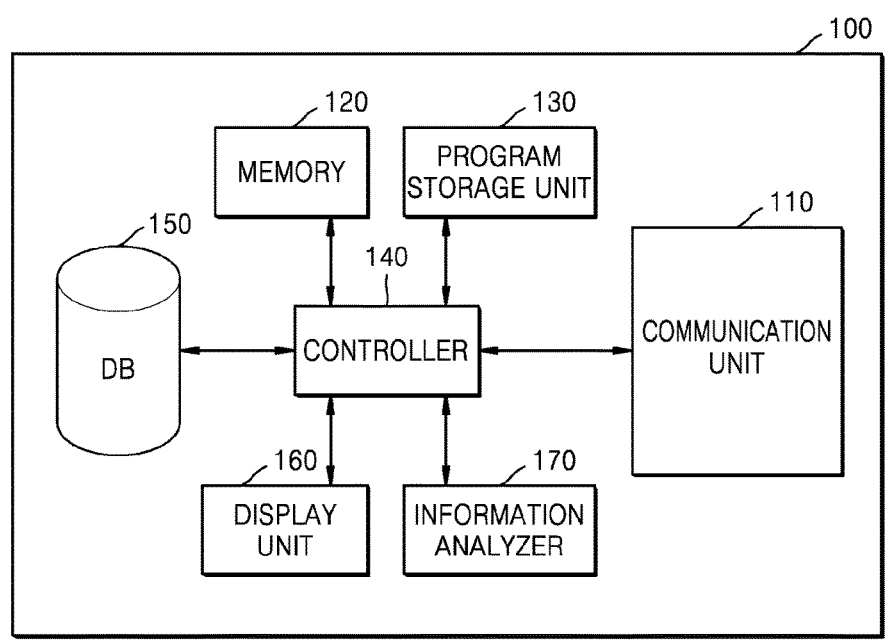
FIG. 2 is a schematic block diagram of a structure of an information analyzing apparatus included in the information analyzing system of FIG. 1.

FIG. 2 is a schematic block diagram of a structure of the information analyzing apparatus 100 included in the information analyzing system 1 of FIG. 1. Referring to FIG. 2, the information analyzing apparatus 100 may include a communication unit 110, a memory 120, a program storage unit 130, a controller 140, a database (DB) 150, a display unit 160, and an information analyzer 170.

The communication unit 110 may provide a communication interface needed to provide a signal in the form of packet data to be exchanged among the information analyzing apparatus 100, the first processing apparatus 200, the second processing apparatus 300, and the third processing apparatus 400 while being linked to the communication network 500. The communication unit 110 may receive second-user information from the first processing apparatus 200, transmit an information packet to the second processing apparatus 300, receive an information packet result to which a second signal is added from the second processing apparatus 300, and transmit a level index to the third processing apparatus 400 according to a request from the third processing apparatus 400.

The communication unit 110 may be a device including hardware and software needed to transmit a signal such as a control signal or a data signal to another network device or receive such a signal from the other network device by being connected to the other network device via wire or wirelessly.

The memory 120 temporarily or permanently stores data processed by the controller 140. Here, the memory 120 may include a magnetic storage medium or a flash storage medium but the scope of the inventive concept is not limited thereto.

The program storage unit 130 includes therein control software performing a task of receiving the second-user information from the first processing apparatus 200 and generating the information packet, a task of transmitting the information packet to the second processing apparatus 300 and receiving the information packet result to which the second signal is added from the second processing apparatus 300, a task of generating the level index from the information packet result, a task of transmitting the level index to the third processing apparatus 400 according to a request from the third processing apparatus 400, etc.

The controller 140 is a type of a central processing unit (CPU) and may control a whole process of generating the level index by using the information packet result received from the second processing apparatus 300. As described above, the controller 140 may control a whole processing process related to the exchange of information between the information analyzing apparatus 100, the first processing apparatus 200, the second processing apparatus 300, and the third processing apparatus 400.

The DB 150 may include a first-user DB storing first-user information. Here, the first-user information stored in the first-user DB may include unique information of the first processing apparatus 200 linked to a second user, location information of the shop, the code of the shop, a unique number, basic information of each first user (e.g., personal data, sex, age, contact information, etc.), information related to an event which is being held or which was held, ranking information, information representing whether tangible and intangible elements are to be improved, etc.

The DB 150 may further include a second-user DB storing second-user information. Here, the second-user information stored in the second-user DB may include basic information of each second user (e.g., personal data, sex, age, contact information, etc.), authentication-related information (e.g., access identification (ID) information, a password, etc.), access-related information (e.g., an access country, an accessed position, information regarding a device used to perform an access, an accessed network environment, etc.), a number of times purchasing is performed, an accumulated purchase amount, etc.

The DB 150 may further include a third-user DB storing third-user information. Here, the third-user information stored in the third-user DB may include reward information, a level-index transmission history, etc. to be provided to the second processing apparatus 300.

The display unit 160 may display a result of generating the level index in various forms, e.g., graphics, texts, a drawing, etc., and a current status of the exchange of information among the information analyzing apparatus 100, the first processing apparatus 200, the second processing apparatus 300, and the third processing apparatus 400.

The information analyzer 170 may receive second-user information contributing to generating the first signal from the first processing apparatus 200 generating the first signal, and generate an information packet corresponding to the second-user information. The information analyzer 170 may transmit the information packet to the second processing apparatus 300 indicated in the second-user information, receive the information packet result to which the second signal is added from the second processing apparatus 300, and analyze the information packet result to generate the level index representing levels of tangible and intangible elements of the shop, an event held in the shop, and/or services which the third user should provide in the near future. The information analyzer 170 may provide accumulable reward information to the first processing apparatus 200 receiving the information packet result, and provide the level index to the third processing apparatus 400 according to a request from the third processing apparatus 400.

Figure 3:
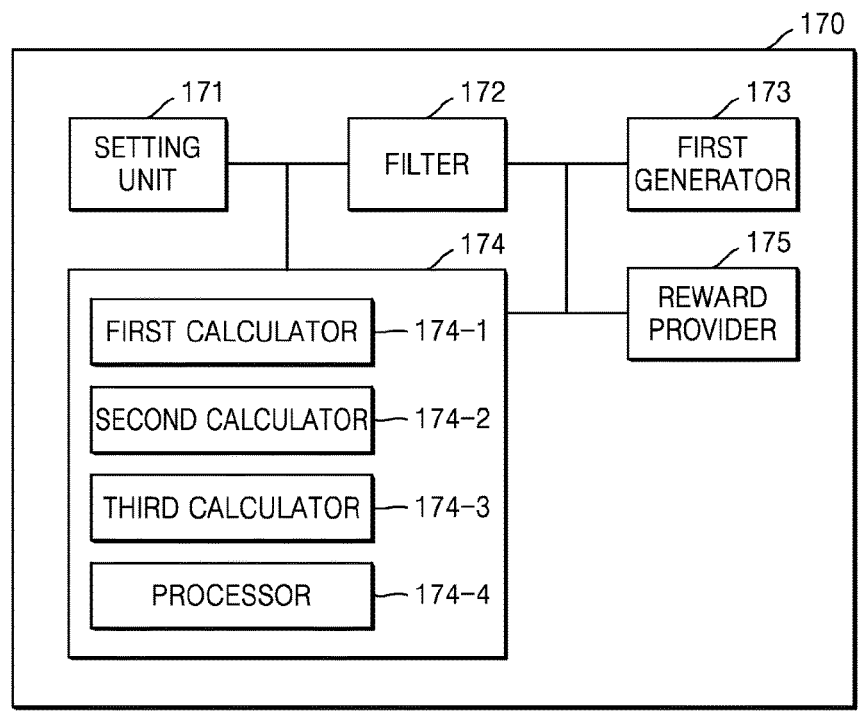
FIG. 3 is a schematic block diagram of a structure of an information analyzer included in the information analyzing apparatus of FIG. 2.

FIG. 3 is a schematic block diagram of a structure of the information analyzer 170 included in the information analyzing apparatus 100 of FIG. 2. Referring to FIG. 3, the information analyzer 170 may include a setting unit 171, a filter 172, a first generator 173, a second generator 174, and a reward provider 175.

The setting unit 171 may set a first condition for transmitting an information packet. Here, the first condition may include at least one among time information including at least one among day, month, year, time, a duration, and a cycle, information regarding a second user who will first transmit the information packet, information regarding a second user who has ever visited a shop where the information packet is to be transmitted, second users' ages and sexes, and information regarding the first processing apparatus 200 which will transmit the information packet. For example, the setting unit 171 may set women in their twenties who first visited a shop at Gangnam-ku once a month as the first condition for transmitting the information packet. The first condition set by the setting unit 171 may vary according to a purpose of generating a level index.

The filter 172 may filter a second user who satisfies the first condition from second-user information received from the first processing apparatus 200. In the present embodiment, it is defined that the information packet is transmitted to a second user satisfying the first condition among second users contributing to generation of the first signal. Alternatively, the information packet may be transmitted to a second user who visits a shop even if the second user does not contribute to generation of the first signal. To this end, the first processing apparatus 200 may transmit a signal suggesting that the information packet be transmitted to the second processing apparatus 300 of a nearby second user by using a wireless communication function, and transmit the information packet to the second processing apparatus 300 when the second processing apparatus 300 accepts the suggestion.

The first generator 173 may receive the second-user information contributing to generation of the first signal from the first processing apparatus 200 generating the first signal, and generate an information packet corresponding to the second-user information. Here, the information packet may be made or updated according to the shop.

The second generator 174 may transmit the information packet to the second processing apparatus 300 indicated in the second-user information, receive an information packet result to which a second signal is added from the second processing apparatus 300, and analyze the information packet result to generate a level index representing levels of tangible and intangible elements of the shop, an event held in the shop, and/or services which a third user should provide in the near future. The second generator 174 may include a first calculator 174-1, a second calculator 174-2, a third calculator 174-3, and a processor 174-4.

The first calculator 174-1 may generate a first index from a first information packet result on the basis of an average index representing an average of scores selected by second users, a user index representing users who have a good feeling toward a third user, and a weight, and accurately calculate ranking of shops on the basis of the first index. For example, if the first index is generated from first information packet results generated by thirty second users with respect to five shops, when the first index is generated only using an average index, the same average index may be calculated with respect to all the five shops and thus the accuracy of the first index may be low even though scores selected by the second users with respect to each of the five shops are different. Thus, a user index may further be used to improve the accuracy of the first index. Accordingly, a third user will be able to manage a shop to increase competitiveness with other shops according to calculated ranking of shops and provide second users with higher-quality tangible and intangible elements on the basis of the first index.

Here, the first index may be calculated by using Equation 1 below.

$$\text{First index} = \text{average index} + \text{user index} \quad [\text{Equation 1}]$$

Here, the 'average index' represents an average of scores which second users select from a first information packet result, and may include a result of dividing the sum of the selected scores by the number of all second users who transmit information packet results. The 'user index' may represent an index of preference for a third user. Here, the user index may include, for example, a customer loyalty score. The term "customer loyalty" means that as a company (a third user) continuously provides exceptional values to a customer (a second user), the customer has a good feeling or a sense of loyalty toward the company, thereby maintaining the customer's purchasing activity. A gain obtained from higher-level customer loyalty is high. When customer loyalty is continuously achieved, the company's sales and market share are improved and costs of maintaining customers decrease. Thus, an additional gain achieved accordingly may be used to increase customer values, be invested to a new sector, or be used to improve employee compensation or the like.

Alternatively, the user index may be calculated by using Equation 2 below.

$$\text{User index} = \frac{(\text{good} - \text{bad})}{\text{total number of second users transmitting information packet result}} \times \text{weight} \quad [\text{Equation 2}]$$

In Equation 2, the "good" may represent the number of '5s' selected as scores in the first information packet result, and the "bad" may represent the number of '1s', '2s', and '3s' selected as scores in the first information packet result.

The "weight" may include a first weight to a fourth weight. At least one among the first to fourth weights may be selectively applied. As default, all the first to fourth weights may be applied or at least one among the first to fourth weights may be selected. The first weight may be differently applied according to a type of business, brand, or the location of a shop. A higher first weight may be assigned to a business, brand, or a shop with big sales. A lower first weight may be assigned to a business, brand, or a shop with low sales.

The second weight may be differently applied according to a second user who generates a first information packet result. If a second user who used to select '1' to generate a first information packet result selects '5' to generate a first information packet result, a higher second weight may be applied. If a second user who used to select '3' to generate a first information packet result selects '1' to generate a first information packet result, a lower second weight may be applied. Accordingly, individual second users' tendencies may be grasped to improve the accuracy of the first index.

The third weight may vary according to a second index. A higher third weight may be applied when an average of second indexes is greater than or equal to a reference value, e.g., 3.5, and a lower third weight may be applied when the average of the second indexes is less than the reference value.

The fourth weight may vary according to a third index. A higher fourth weight may be applied when a result of calculating the third index is positive, and a lower fourth weight may be applied when this result is negative.

The second calculator 174-2 may generate the second index on the basis of an average index obtained by calculating an average of scores selected by second users from a second information packet result. A third user will be able to determine matters to be improved on the basis of the second index and improve them.

The third calculator 174-3 may extract keywords from text which is a third information packet result input by a second user according to a machine learning method, and compare the extracted keywords with reference keywords so as to accurately determine content input by the second user. For example, when the extracted keywords are 'restroom', 'clean', and 'need', the third calculator 174-3 may compare them with the reference keywords and conclude that a restroom of a corresponding shop is not clean. Therefore, a third user will be able to determine matters of a shop to be improved from a third index and improve them.

The processor 174-4 may generate the first index to the third index and/or a level index which is a result of synthesizing the first to fourth indexes, and transmit the level index to the third processing apparatus 400 according to a request for the level index from the third processing apparatus 400. Here, the level index may be generated in various forms, e.g., graphics, text, or a table, on the basis of time periods or shops. As an alternative embodiment, the level index may include various information, such as the number of information packets transmitted to second users, the number of information packets received from the second users, each of scores which the second users select, an average of levels of satisfaction with respect to a shop, etc.

The reward provider 175 may provide accumulable reward information to the second processing apparatus 300 receiving an information packet result. Such a reward may be registered with the information analyzer 170 by the third processing apparatus 400 and provided to the second processing apparatus 300. Alternatively, the information analyzer 170 may provide a reward registered therewith by the third processing apparatus 400 to the second processing apparatus 300 via the first processing apparatus 200. As an alternative embodiment, the reward provider 175 may provide a reward to a shop which ranks first and provide a penalty to a shop which ranks last according to the first index.

Figure 4:
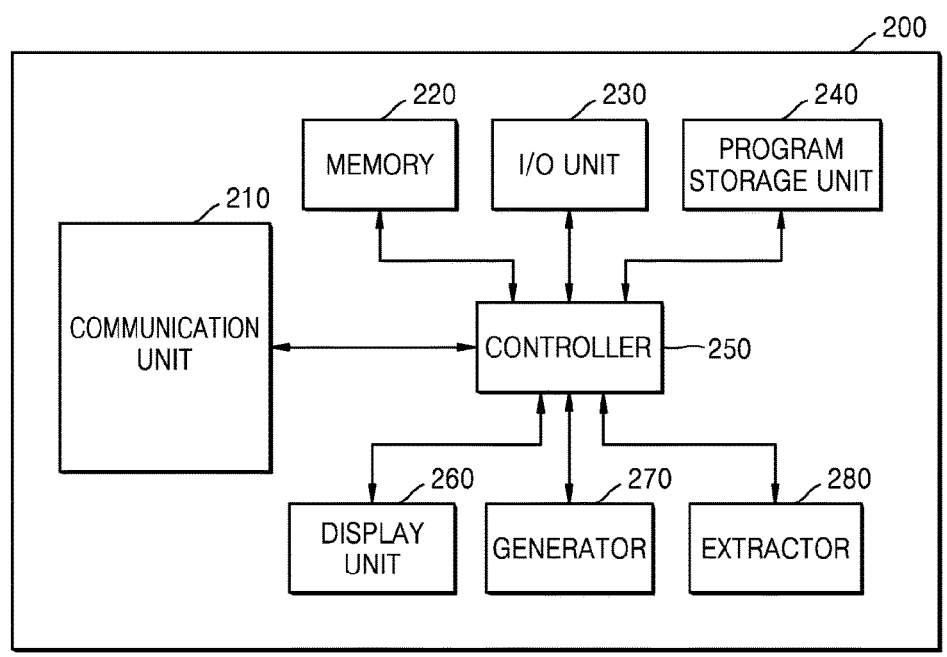
FIG. 4 is a schematic block diagram of a structure of a first processing apparatus included in the information analyzing system of FIG. 1.

FIG. 4 is a schematic block diagram of a structure of the first processing apparatus 200 included in the information analyzing system 1 of FIG. 1. Referring to FIG. 4, the first processing apparatus 200 may include a communication unit 210, a memory 220, an input/output (I/O) unit 230, a program storage unit 240, a controller 250, a display unit 260, a generator 270, and an extractor 280.

The communication unit 210 may be a device including hardware and software needed to transmit a signal such as a control signal or a data signal to, or receive such a signal from, a network device which is different from the first processing apparatus 200 by being connected to the network device via wire or wirelessly. For example, the communication unit 210 may include a short-range wireless communication unit or a mobile communication unit. Examples of the short-range wireless communication unit include, but are not limited to, a Bluetooth communication unit, a Bluetooth low energy (BLE) communication unit, a near-field communication unit, a WLAN (Wi-Fi) communication unit, a Zigbee communication unit, an infrared data association ((IrDA) communication unit, a Wi-Fi direct (WFD) communication unit, an ultra-wideband (UWB) communication unit, an Ant+ communication unit, etc. The mobile communication unit transmits a radio signal to or receives a radio signal from at least one among a base station, an external terminal, and a server in a mobile communication network. Here, the radio signal may include a voice call signal, a video call signal, or various types of data generated during exchange of text/multimedia messages.

The memory 220 may temporarily or permanently store data processed by the controller 250 or data processed by the first processing apparatus 200. Here, the memory 220 may include a magnetic storage medium or a flash storage medium but the scope of the inventive concept is not limited thereto.

The I/O unit 230 may be a touch recognition display controller or any of various other I/O controllers. For example, the touch recognition display controller may provide an output interface and an input interface between a device and a user. The touch recognition display controller may transmit an electrical signal to or receive an electrical signal from the controller 250. Furthermore, the touch recognition display controller displays a visual output to a user. The visual output may include text, graphics, an image, video, or a combination thereof. The I/O unit 230 may be, for example, a display member having a touch recognition function, such as an organic light emitting display (OLED) or a liquid crystal display (LCD).

The program storage unit 240 may include control software performing a task of generating a first signal, a task of generating a receipt from the first signal, a task of extracting second-user information from the first signal, a task of transmitting the second-user information to the information analyzing apparatus 100, a task of linking the information analyzing apparatus 100, the second processing apparatus 300, and the third processing apparatus 400 to one another, etc.

The controller 250 is a type of a CPU and may control overall operations of the first processing apparatus 200. Here, examples of the controller 250 may include various types of devices capable of processing data, e.g., a processor. Here, the 'processor' may be understood, for example, as a data processing device which has a physically structured circuit to perform a function expressed with code or commands included in a program and which is embedded in hardware. Examples of the data processing device embedded in hardware may include processing devices such as a microprocessor, a CPU, a processor core, a multiprocessor, an application-specific integrated circuit (ASIC), and a field-programmable gate array (FPGA) but the scope of the inventive concept is not limited thereto.

The display unit 260 may display a series of processes of generating a first signal, extracting second-user information, and transmitting the second-user information to the information analyzing apparatus 100, performed by the first processing apparatus 200, and a series of processes performed when the information analyzing apparatus 100, the second processing apparatus 300, and the third processing apparatus 400 are linked to one another, under control of the controller 250.

The generator 270 may generate a receipt when the first signal is generated. The extractor 280 may extract the second-user information from a payment statement including the receipt, and transmit it to the information analyzing apparatus 100.

Figure 5:
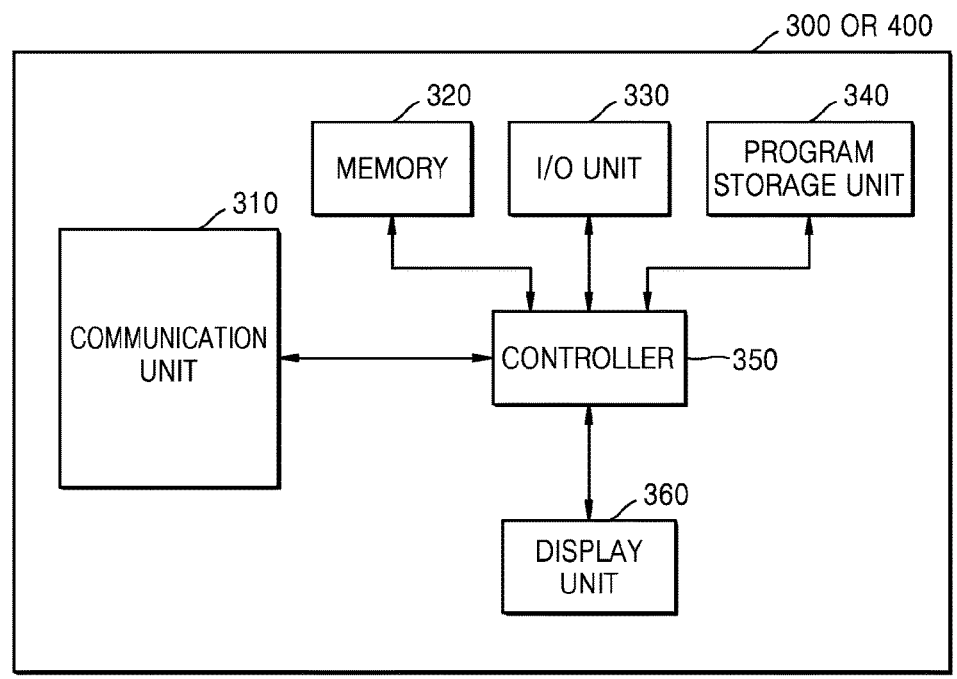
FIG. 5 is a schematic block diagram of structures of a second processing apparatus and a third processing apparatus included in the information analyzing system of FIG. 1.

FIG. 5 is a schematic block diagram of structures of the second processing apparatus 300 and the third processing apparatus 400 included in the information analyzing system 1 of FIG. 1. Referring to FIG. 5, each of the second processing apparatus 300 and the third processing apparatus 400 may include a communication unit 310, a memory 320, an I/O unit 330, a program storage unit 340, a controller 350, and a display unit 360. The communication unit 310, the memory 320, and the I/O unit 330 of FIG. 5 are substantially the same as of the communication unit 210, the memory 220, and the I/O unit 230 of FIG. 4 and are thus not described in detail here.

In the second processing apparatus 300, the program storage unit 340 may include control software performing a task of receiving an information packet, a task of generating an information packet result by adding a second signal to the information packet, a task of receiving a reward, etc. In the third processing apparatus 400, the program storage unit 340 may include control software performing a task of receiving a level index according to a request for the level index, etc.

The controller 350 is a type of a CPU and may control overall operations of the second processing apparatus 300 and the third processing apparatus 400.

In the second processing apparatus 300, the display unit 360 may display an information packet, display a process of adding the second signal to the information packet, and display a reward received from the information analyzing apparatus 100, under control of the controller 350. In the third processing apparatus 400, the display unit 360 may display a current status of a request for the level index and display the level index received from the information analyzing apparatus 100, under control of the controller 350.

Figure 6:
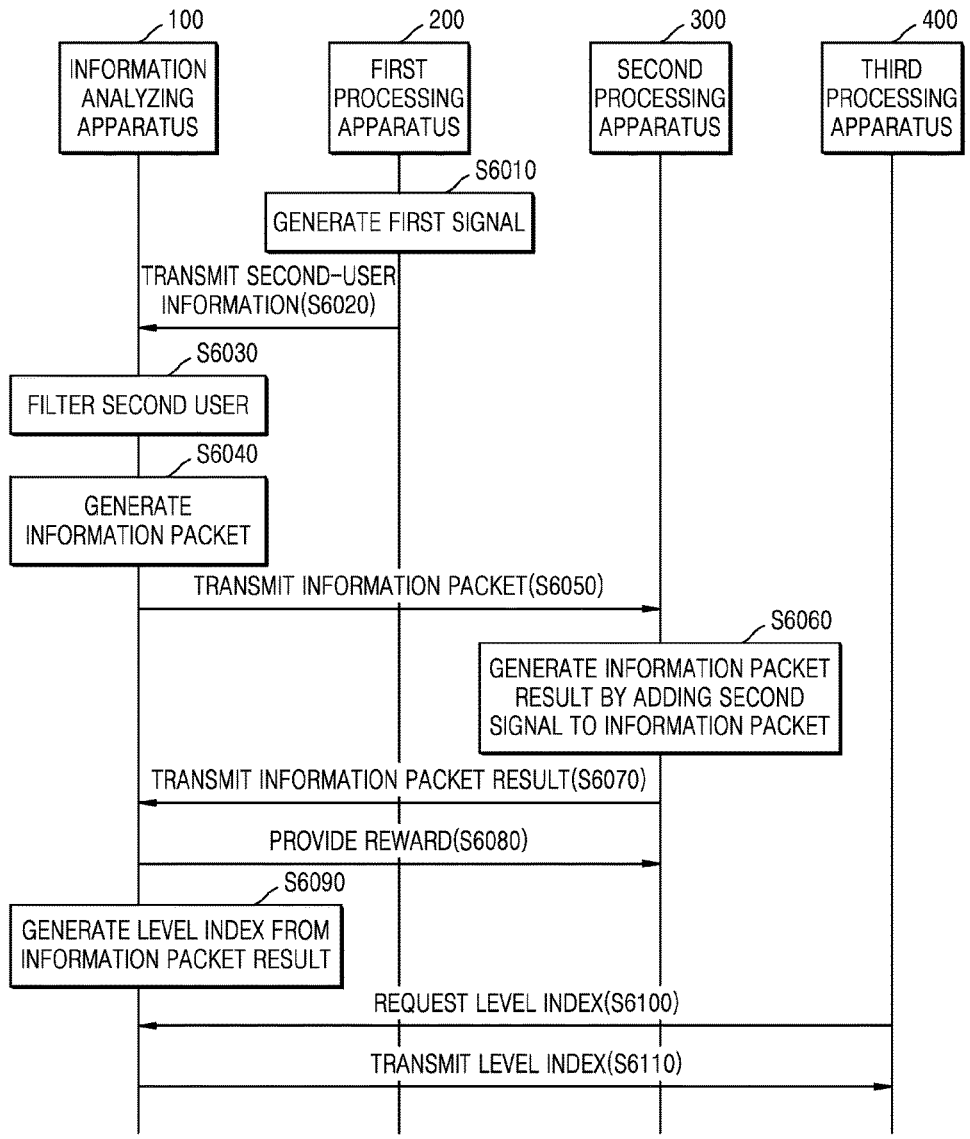

FIG. 6 is a flowchart of an information analyzing method according to one embodiment. In the following description, parts of the information analyzing method of FIG. 6 which are the same as those of FIGS. 1 to 5 are not redundantly described again here.

Referring to FIG. 6, a first processing apparatus 200 generates a first signal (operation S6010). Here, the first signal may include a signal generated when a second user visits the vicinity of the first processing apparatus 200 or a place including the first processing apparatus 200 (hereinafter referred to as a shop) and pay for a tangible element and/or an intangible element. When the first signal is generated, a receipt and/or purchase history information may be generated.

The first processing apparatus 200 extracts second-user information from the receipt and/or the purchase history information and transmits it to an information analyzing apparatus 100 (operation S6020). For example, the second-user information may include at least one among a unique number of the first processing apparatus 200, local information, the second user's sex and age, a purchase amount, a number of times purchasing is performed, and information regarding a second processing apparatus 300 (e.g., a telephone number, a telecommunication company, etc.).

The information analyzing apparatus 100 receives the second-user information and filters a second user satisfying a first condition (operation S6030). Here, the first condition may include at least one among time information (including at least one among day, month, year, time, a duration, and a cycle), information regarding a second user who will first transmit an information packet, information regarding a second user who has ever visited a shop where an information packet will be transmitted, second users' age and sex, and information regarding the first processing apparatus 200 which will transmit an information packet. For example, when a woman in her twenties who first visited a shop at Gangnam-ku once a month is set as the first condition, the information analyzing apparatus 100 may filter a second user satisfying the first condition, i.e., a woman in her twenties who first visited the shop at Gangnam-ku once a month, from the second-user information.

The information analyzing apparatus 100 generates an information packet corresponding to second-user information regarding the filtered second user (operation S6040). Here, the information packet may include survey information provided to the second processing apparatus 300 to evaluate tangible and intangible elements provided in the shop. This information packet may include a first information packet to a third information packet. The first information packet may include survey information requesting a second user to select degrees of satisfaction with respect to the tangible and intangible elements provided in the shop. The second information packet may include survey information requesting the second user to select degrees of satisfaction with respect to an intangible element planned by a third user and provided by a first user, e.g., an event held in the shop. The third information packet may include survey information which is related to services which the third user should provide in the near future and in which the second user may directly answer in the form of text to questions included in the survey information. The information packet may be provided in the form of a URL to the second processing apparatus 300. The second processing apparatus 300 may access the URL to view the information packet. The information analyzing apparatus 100 may differently generate an information packet to correspond to the second-user information.

The information analyzing apparatus 100 transmits the information packet to the second processing apparatus 300 of the filtered second user (operation S6050).

The second processing apparatus 300 generates an information packet result by adding a second signal to the information packet (operation S6060). Here, the second signal may include scores selected by second users with respect to the first and second information packets provided on a scale of 1 to 5 and/or text information regarding the third information packet.

The second processing apparatus 300 transmits the information packet result to the information analyzing apparatus 100 (operation S6070).

When receiving the information packet result, the information analyzing apparatus 100 provides a reward to the second processing apparatus 300 transmitting the information packet result (operation S6080).

The information analyzing apparatus 100 generates a level index from the information packet result (operation S6090).

The third processing apparatus 400 requests the information analyzing apparatus 100 to provide the level index (operation S6100).

The information analyzing apparatus 100 transmits the level index to the third processing apparatus 400 (operation S6110).

Figure 7:
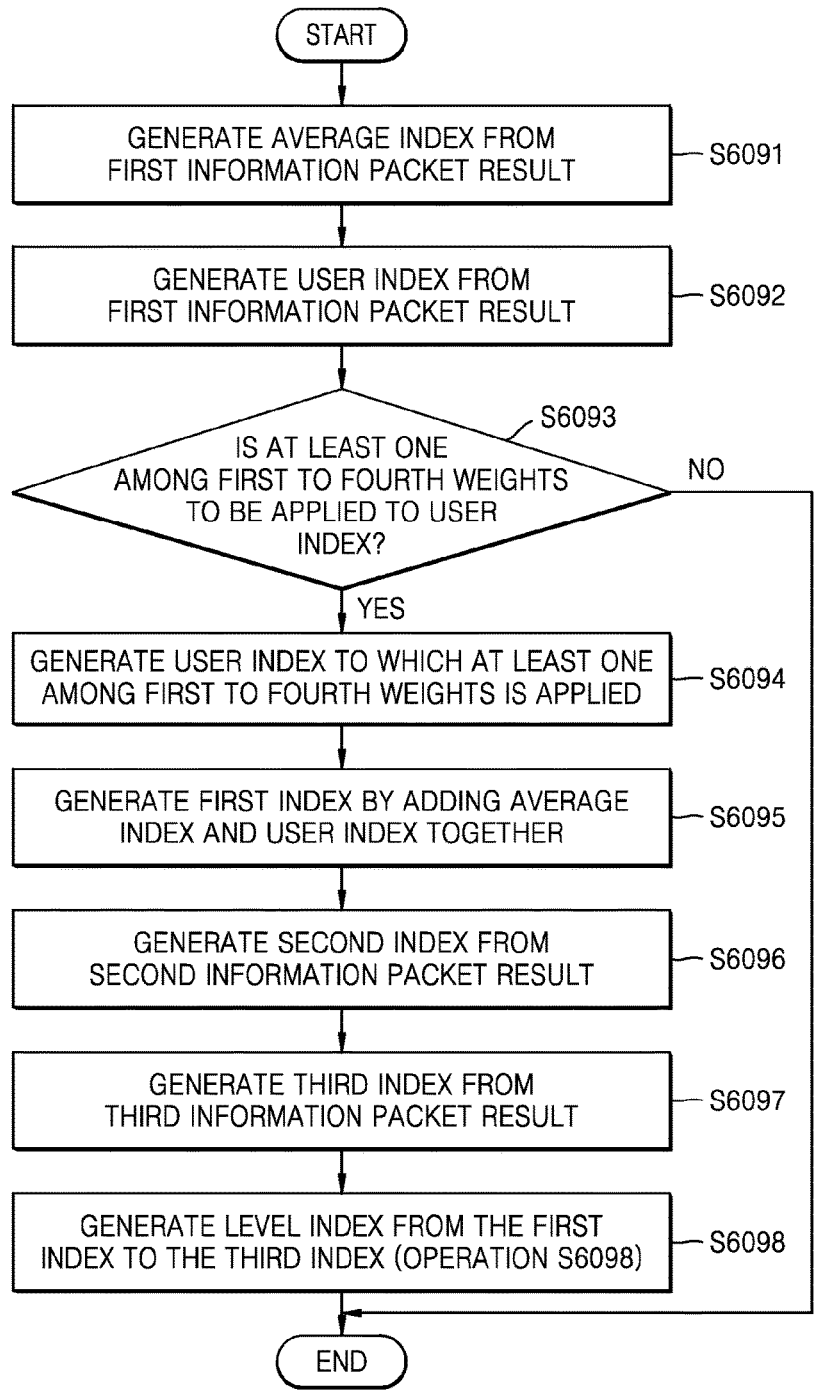

FIG. 7 is a flowchart of a method of generating a level index according to one embodiment. In the following description, parts of the method of FIG. 7 which is the same as those of FIGS. 1 to 6 are not redundantly described again here.

Referring to FIG. 7, the information analyzing apparatus 100 generates an average index from a first information packet result (operation S6091). Here, the average index may include a result of dividing the sum of all scores selected from the first information packet result by the number of second users who transmit information packet results.

The information analyzing apparatus 100 generates a user index from the first information packet result (operation S6092). Here, the user index may include, for example, a customer loyalty score. The user index may include a result obtained by subtracting the number of 1s', 2s', and 3s' selected from the first information packet result (bad elements) from the number of 5s' selected from the first information packet result (good elements), dividing the result of subtraction by the number of all second users who transmit information packet results, and multiplying the result of division by a weight.

The information analyzing apparatus 100 determines whether at least one among a first weight to a fourth weight is to be applied to the user index (operation S6093). The first weight may be differently applied according to the type of business, brand, or the location of a shop. The second weight may be differently applied according to a second user who generates the first information packet result, and may contribute to improving the accuracy of a first index by grasping individual second users' tendencies. The third weight may vary according to a result of calculating a second index. The fourth weight may vary according to a result of calculating a third index. As a default, all the first to fourth weights may be applied or at least one among the first to fourth weights may be selected.

The information analyzing apparatus 100 generates a user index to which at least one among the first to fourth weights is applied (operation S6094).

The information analyzing apparatus 100 generates a first index by adding the average index and the user index together (operation S6095).

The information analyzing apparatus 100 generates a second index from a second information packet result (operation S6096). The information analyzing apparatus 100 may generate the second index on the basis of an average index obtained by calculating an average of scores which second users select in the second information packet result.

The information analyzing apparatus 100 generates a third index from a third information packet result (operation S6097). The information analyzing apparatus 100 may extract keywords from text, which is a third information packet result input by a second user, according to a machine learning method, and compare the extracted keywords with reference keywords to accurately determine content input by the second user.

The information analyzing apparatus 100 generates a level index from the first index to the third index (operation S6098).

Figure 8:
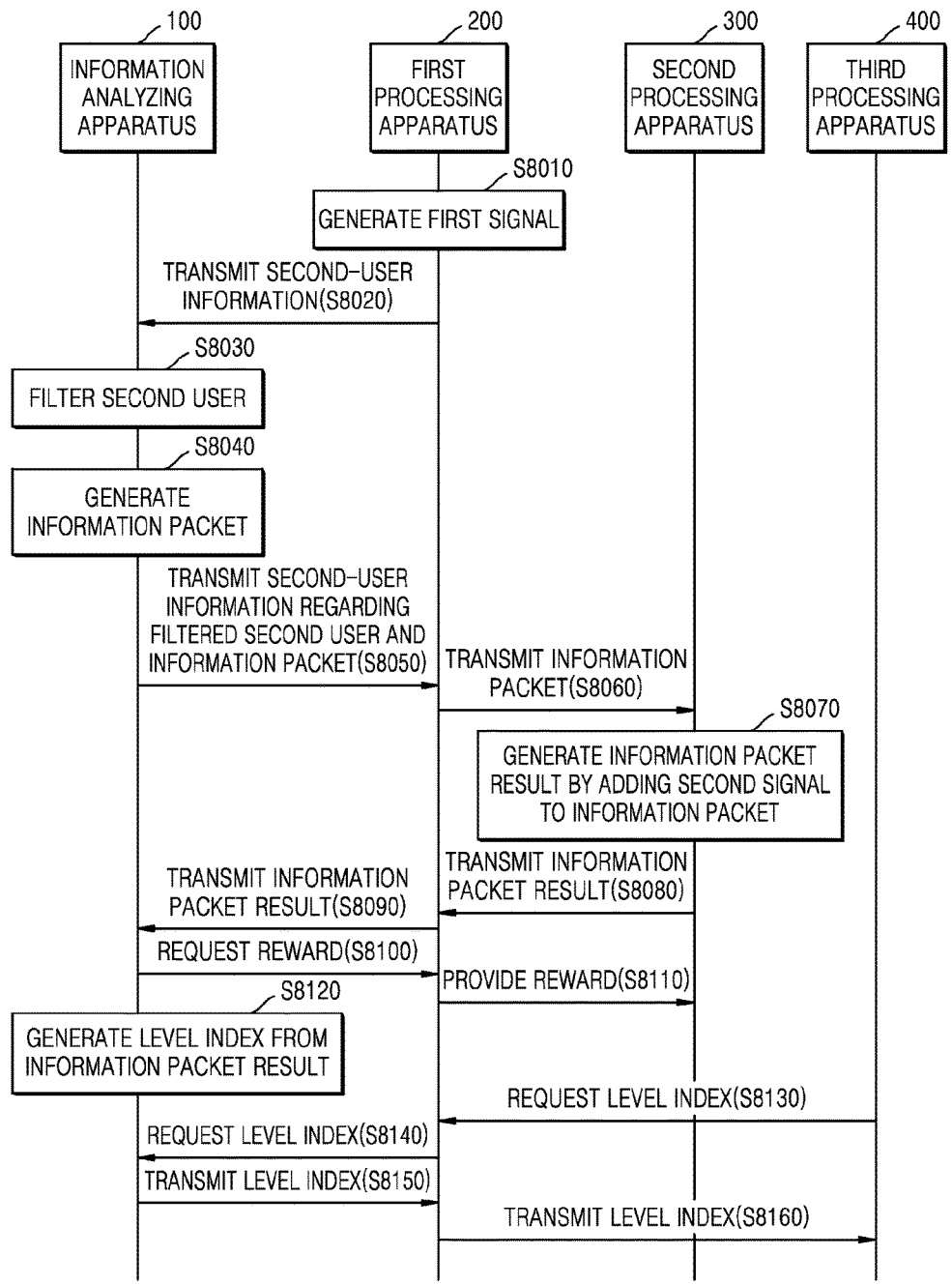

FIG. 8 is a flowchart of an information analyzing method according to another embodiment. In the following description, parts of the information analyzing method of FIG. 8 which are the same as those of FIGS. 1 to 7 are not redundantly described again here. In the information analyzing method of FIG. 8, an information analyzing apparatus 100 and a first processing apparatus 200 are operated while being linked to each other, thereby reducing the load on the information analyzing apparatus 100, compared to the information analyzing method of FIG. 6.

Referring to FIG. 8, the first processing apparatus 200 generates a first signal (operation S8010).

The first processing apparatus 200 extracts second-user information from a receipt and/or purchase history information and transmits the second-user information to the information analyzing apparatus 100 (operation S8020).

The information analyzing apparatus 100 receives the second-user information and filters a second user satisfying a first condition (operation S8030).

The information analyzing apparatus 100 generates an information packet to correspond to second-user information regarding the filtered second user (operation S8040).

The information analyzing apparatus 100 transmits the second-user information regarding the filtered second user and the information packet to the first processing apparatus 200 (operation S8050).

The first processing apparatus 200 extracts the second user filtered by the information analyzing apparatus 100 from second users who generate the first signal, and transmits the information packet to the second processing apparatus 300 of the filtered second user (operation S8060).

The second processing apparatus 300 generates an information packet result by adding a second signal to the received information packet (operation S8070).

The second processing apparatus 300 transmits the information packet result to the first processing apparatus 200 (operation S8080).

The first processing apparatus 200 transmits the information packet result to the information analyzing apparatus 100 (operation S8090).

When receiving the information packet result, the information analyzing apparatus 100 transmits, to the first processing apparatus 200, a reward request signal requesting to provide a reward to the second processing apparatus 300 generating the information packet result (operation S8100).

The first processing apparatus 200 provides a reward to the second processing apparatus 300 according to the reward request signal from the information analyzing apparatus 100 (operation S8110).

The information analyzing apparatus 100 generates a level index from the information packet result (operation S8120). A method of generating the level index by the information analyzing apparatus 100 is substantially the same as that of FIG. 7 and is thus not described again here.

The third processing apparatus 400 requests the first processing apparatus 200 to provide the level index (operation S8130).

The first processing apparatus 200 requests the information analyzing apparatus 100 to provide the level index (operation S8140).

The information analyzing apparatus 100 transmits the level index to the first processing apparatus 200 (operation S8150).

The first processing apparatus 200 transmits the level index to the third processing apparatus 400 (operation S8160).

Figure 9:
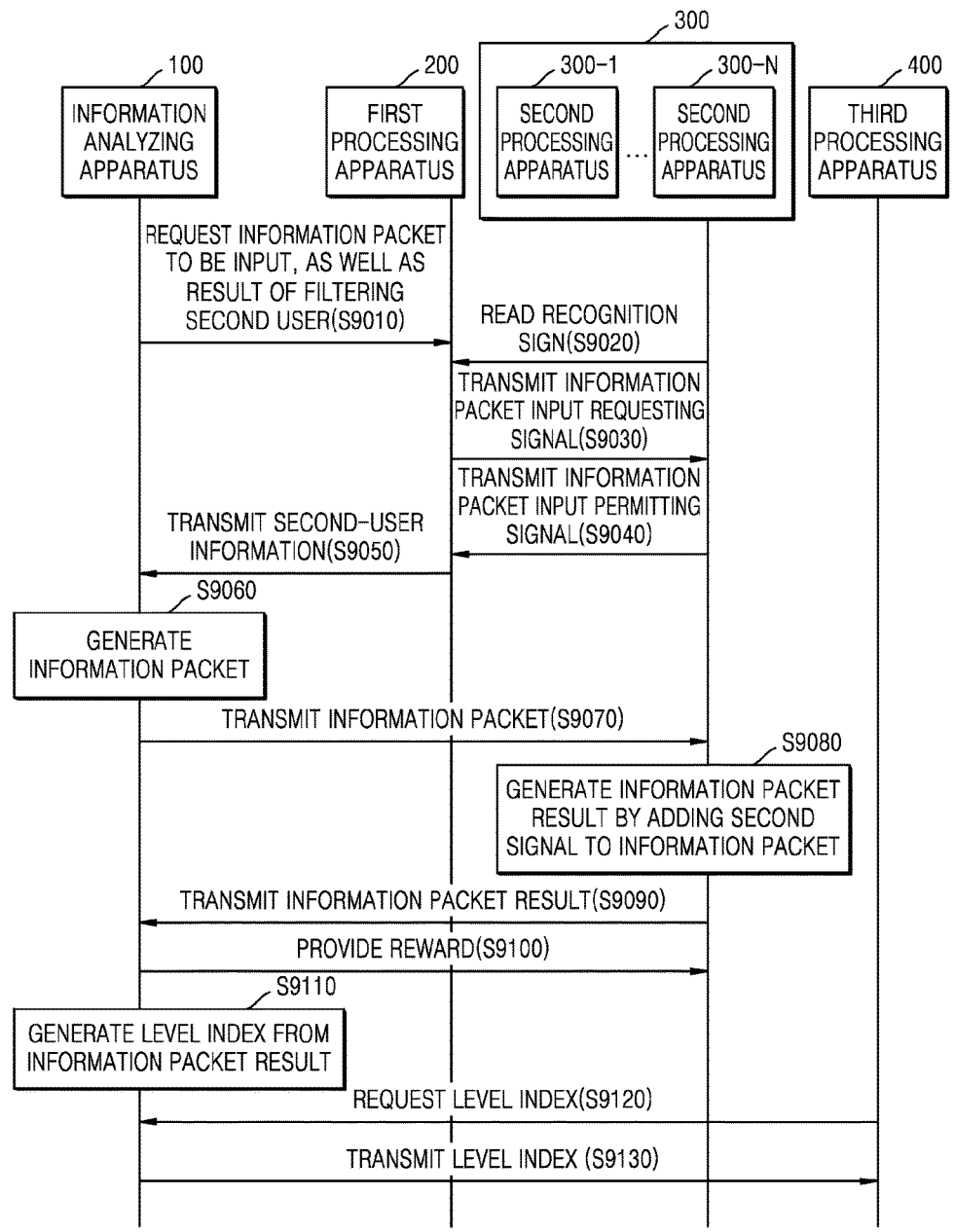

FIG. 9 is a flowchart of an information analyzing method according to another embodiment. In the following description, parts of the information analyzing method of FIG. 9 which are the same as those of FIGS. 1 to 8 are not redundantly described again here. In FIG. 9, a first signal is not generated and a level index is generated by receiving an information packet result from a second user who visits a shop, compared to FIGS. 6 to 8. To this end, a recognition sign (not shown) storing second-user information may be provided inside or outside a second processing apparatus 300. The recognition sign may include at least one among an NFC chip, a radio-frequency identification (RFID) chip, and a quick-response (QR) code which a first user may provide to a second user who visits the shop and purchases a tangible element or an intangible element. Furthermore, a first processing apparatus 200 may include at least one among readers (not shown) capable of reading the recognition sign, e.g., an NFC reader, an RFID reader, and a scanner.

Referring to FIG. 9, an information analyzing apparatus 100 transmits to the first processing apparatus 200 a signal requesting to input an information packet as well as a result of filtering a second user satisfying a first condition (operation S9010).

When the signal requesting the information packet as well as the result of filtering the second user is used, the first processing apparatus 200 reads recognition signs included in second processing apparatuses 300-1 to 300-N provided in the shop (operation S9020).

The first processing apparatus 200 transmits an information packet input requesting signal requesting a second signal to be added to the information packet to the second processing apparatuses 300-1 to 300N which are satisfied with the result of filtering the second user on the basis of a result of reading the recognition signs included in the second processing apparatuses 300-1 to 300-N (operation S9030).

The second processing apparatuses 300-1 to 300N receive the information packet input requesting signal, and transmits an information packet input permitting signal to the first processing apparatus 200 when a second signal is to be added to the information packet (operation S9040).

first processing apparatus 200 transmits second-user information regarding the second processing apparatuses 300-1 to 300-N receiving the information packet input permitting signal to the information analyzing apparatus 100 (operation S9050).

The information analyzing apparatus 100 generates an information packet to correspond to the second-user information (operation S9060). Here, the information analyzing apparatus 100 may generate the information packet beforehand and stand by to receive the second-user information.

The information analyzing apparatus 100 transmits the information packet to the second processing apparatuses 300-1 to 300-N receiving the information packet input permitting signal (operation S9070).

The second processing apparatuses 300-1 to 300-N receiving the information packet input permitting signal each generate an information packet result by adding a second signal to the information packet (operation S9080).

The second processing apparatuses 300-1 to 300-N receiving the information packet input permitting signal transmit the information packet result to the information analyzing apparatus 100 (operation S9090).

When receiving the information packet result, the information analyzing apparatus 100 provides a reward to the second processing apparatuses 300-1 to 300-N (operation S9100).

The information analyzing apparatus 100 generates a level index from the information packet result (operation S9110). A method of generating the level index by the information analyzing apparatus 100 is substantially the same as that of FIG. 7 and is not redundantly described here.

The third processing apparatus 400 requests the information analyzing apparatus 100 to provide the level index (operation S9120).

The information analyzing apparatus 100 transmits the level index to the third processing apparatus 400 (operation S9130).

FIG. 10 is a flowchart of an information analyzing method according to another embodiment. In the following description, parts of the information analyzing method of FIG. 10 which are the same as those of FIGS. 1 to 9 are not redundantly described again here. In FIG. 10, an information analyzing apparatus 100 and a first processing apparatus 200 are operated while being linked to each other, thereby reducing the load on the information analyzing apparatus 100, compared to FIG. 9.

Referring to FIG. 10, the information analyzing apparatus 100 transmits a signal requesting the first processing apparatus 200 to input an information packet as well as a result of filtering a second user who satisfies a first condition (operation S10010).

When receiving this signal, the first processing apparatus 200 reads recognition signs included in second processing apparatuses 300-1 to 300-N provided in a shop (operation S10020).

The first processing apparatus 200 transmits an information packet input requesting signal requesting a second signal to be added to an information packet to the second processing apparatuses 300-1 to 300-N which are satisfied with the result of filtering the second user on the basis of reading the recognition signs (operation S10030).

The second processing apparatuses 300-1 to 300-N receive the information packet input requesting signal and transmit an information packet input permitting signal to the first processing apparatus 200 when the second signal is to be added to the information packet (operation S10040).

The first processing apparatus 200 transmits, to the information analyzing apparatus 100, second-user information regarding the second processing apparatuses 300-1 to 300-N receiving the information packet input permitting signal (operation S10050).

The information analyzing apparatus 100 generates an information packet to correspond to the second-user information (operation S10060). Here, the information analyzing apparatus 100 may generate the information packet beforehand and stand by to receive the second-user information.

The information analyzing apparatus 100 transmits the information packet to the first processing apparatus 200 (operation S10070).

The first processing apparatus 200 transmits the information packet to the second processing apparatuses 300-1 to 300-N (operation S10080).

The second processing apparatuses 300-1 to 300-N generate an information packet result by adding the second signal to the information packet (operation S10090).

The second processing apparatuses 300-1 to 300-N transmit the information packet result to the first processing apparatus 200 (operation S10100).

The first processing apparatus 200 transmit the information packet result to the information analyzing apparatus 100 (operation S10110).

When receiving the information packet results, the information analyzing apparatus 100 transmits to the first processing apparatus 200 a signal requesting a reward to be provided to the second processing apparatuses 300-1 to 300-N (operation S10120).

The first processing apparatus 200 provide the reward to the second processing apparatuses 300-1 to 300-N according to this signal (operation S10130).

The information analyzing apparatus 100 generates a level index from the information packet result (operation S10140). A method of generating the level index by the information analyzing apparatus 100 is substantially the same as that of FIG. 7 and is thus not redundantly described again here.

The third processing apparatus 400 requests the first processing apparatus 200 to provide the level index (operation S10150).

The first processing apparatus 200 requests the information analyzing apparatus 100 to provide the level index (operation S10160).

The information analyzing apparatus 100 transmits the level index to the first processing apparatus 200 (operation S10170).

The first processing apparatus 200 transmits the level index to the third processing apparatus 400 (operation S10180).

According to embodiments, a place provided with a second terminal may be easily managed using a composite index representing levels of tangible and intangible elements in the vicinity of the second terminal on the basis of an information packet result fed back from a first terminal.

Furthermore, an element desired by a first user who owns a first terminal may be analyzed and convenience corresponding to a result of analyzing the desired element may be provided to the first user by using a composite index representing levels of tangible and intangible elements in the vicinity of the second terminal on the basis of an information packet result fed back from a first terminal.

In addition, a reward may be provided to a first terminal generating an information packet result so as to induce a first user who owns the first terminal to visit a place provided with a second terminal.

Effects of the inventive concept are not, however, limited to the above effects and other effects would be apparent to those of ordinary skill in the art from the above description.

The above-described embodiments may be embodied as a computer program that can be run through a computer using various elements. The computer program may be recorded on a computer-readable recording medium. Examples of the computer-readable medium may include a magnetic recording medium such as a hard disc, a floppy disk, a magnetic tape, etc., an optical recording medium such as a CD-ROM or a DVD, a magneto-optical medium such as a flopical disk, and a hardware device specifically configured to store and execute program commands, such as a ROM, a RAM, a flash memory, etc.

The computer program may be specially designed and configured for the inventive concept or may be well-known and available to those of ordinary skill in the computer software field. Examples of the computer program may include not only machine language codes prepared by a compiler, but also high-level language codes executable by a computer by using an interpreter.

In the present disclosure, the term "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein.

The operations of all methods described herein can be performed in an appropriate order unless otherwise indicated herein or otherwise clearly contradicted by context. The inventive concept is not limited by an order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those skilled in this art without departing from the spirit and scope of the inventive concept.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An information analyzing apparatus comprising:
a first processing apparatus manipulated by a first user;
a first generator configured to receive second-user information based on generation of a first signal from the first processing apparatus generating the first signal, and
to generate, in response to the second-user information, a first information packet including survey information requesting a second user to select levels of satisfaction with respect to tangible or first intangible elements provided in a shop where the first user works, on a scale of 1 to 5,
a second information packet including survey information requesting the second user to select a degree of satisfaction with respect to a second intangible element including an event which is planned by a third user and provided by the first user, and
a third information packet including survey information related to a service which the third user is requested to provide in the future, in which the second user answers in a form of text; and
a second generator comprising:
a first calculator configured to generate a first index obtained by summing an average index representing an average of scores selected by the second user from a first information packet result, and a user index as a customer loyalty score representing the second user's good feeling toward the third user or the second user's continuous purchasing activity on the tangible or first intangible elements provided by the third user;
a second calculator configured to generate a second index representing an average of scores selected by the second user from a second information packet result; and
a third calculator configured to generate a third index as information containing a summary of services that the third user is requested to pursue in the future by applying a learning machine technique to a third information packet result,
wherein the first calculator generates the user index by a following equation, user index=((good−bad)/total number of second users transmitting information packet result))× weight, wherein "good" represents the number of '5s' selected as scores in the first information packet result, and "bad" represents one of the numbers of '1s', '2s', and '3s' selected as scores in the first information packet result.

2. The information analyzing apparatus of claim 1, further comprising a processor configured to generate a level index based on the first to third indexes and transmit the level index to a third processing apparatus according to a request from the third processing apparatus.

3. The information analyzing apparatus of claim 1, further comprising:
a setting unit configured to set a first condition for transmitting the first to third information packets; and
a filter configured to filter the second user satisfying the first condition from the second-user information.

4. The information analyzing apparatus of claim 1, further comprising a reward provider configured to provide accumulable reward information to the second processing apparatus receiving the first to third information packet results.

5. An information analyzing method performed by an information analyzing apparatus including a first processing apparatus manipulated by a first user, the information analyzing method comprising:
receiving second-user information contributing to generation of a first signal from the first processing apparatus generating the first signal;
generating a first information packet including survey information requesting a second user to select levels of satisfaction with respect to tangible or first intangible elements provided in a shop where the first user works, on a scale of 1 to 5,
a second information packet including survey information requesting the second user to select a degree of satisfaction with respect to a second intangible element including an event which is planned by a third user and provided by the first user, and
a third information packet including survey information related to a service which the third user is requested to provide in the future, in which the second user answers in a form of text, performed by the information analyzing apparatus;
transmitting the first to third information packets to a second processing apparatus indicated in the second-user information;
receiving an information packet result from the second processing apparatus, wherein the information packet result is obtained by adding a second signal to the first to third information packets;
generating a level index by analyzing the information packet result, wherein the level index represents levels of the tangible and first and second intangible elements in the vicinity of the first processing apparatus,
wherein the generating of the level index comprises:
generating a first index obtained by summing an average index representing an average of scores selected by the second user from a first information packet result, and a user index as a customer loyalty score representing the second user's good feeling toward the third user or the second user's continuous purchasing activity on the tangible or first intangible elements provided by the third user;
generating a second index representing an average of scores selected by the second user from a second information packet result; and
generating a third index as information containing a summary of services that the third user is requested to pursue in the future by applying a learning machine technique to a third information packet result,
wherein, in the generating of the level index, the user index is generated by a following equation, user index=((good−bad)/total number of second users transmitting information packet result))× weight, wherein "good" represents the number of '5s' selected as scores in the first information packet result, and "bad" represents one of the numbers of '1s', '2s', and '3s' selected as scores in the first information packet result.

6. The information analyzing method of claim 5, further comprising generating the level index based on the first to third indexes and transmitting the level index to a third processing apparatus according to a request from the third processing apparatus.

7. The information analyzing method of claim 5, further comprising:
setting a first condition for transmitting the first to third information packets; and
filtering the second user satisfying the first condition from the second-user information.

8. The information analyzing method of claim 5, further comprising transmitting accumulable reward information to the second processing apparatus receiving the first to third information packet results.

9. A non-transitory computer-readable recording medium configured to perform the information analyzing method of claim 5 by using a computer.

10. A non-transitory computer-readable recording medium configured to perform the information analyzing method of claim 5 by using a computer.

11. A non-transitory computer-readable recording medium configured to perform the information analyzing method of claim 6 by using a computer.

12. A non-transitory computer-readable recording medium configured to perform the information analyzing method of claim 7 by using a computer.

13. A non-transitory computer-readable recording medium configured to perform the information analyzing method of claim 8 by using a computer.

* * * * *